United States Patent
Bjelland et al.

(10) Patent No.: US 7,103,002 B2
(45) Date of Patent: Sep. 5, 2006

(54) COMMUNICATION MANAGEMENT IN NETWORKS HAVING SPLIT CONTROL PLANES AND USER PLANES

(75) Inventors: Frode Bjelland, Arendal (NO); Juan-Antonio Ibanez, Aachen (DE)

(73) Assignee: Telefonktiebolaget LM Ericsson (publ), Stockholm (SE)

( * ) Notice: Subject to any disclaimer, the term of this patent is extended or adjusted under 35 U.S.C. 154(b) by 771 days.

(21) Appl. No.: 09/903,366

(22) Filed: Jul. 11, 2001

(65) Prior Publication Data

US 2002/0006114 A1  Jan. 17, 2002

Related U.S. Application Data

(60) Provisional application No. 60/217,694, filed on Jul. 12, 2000.

(51) Int. Cl.
*H04L 1/00* (2006.01)
*H04L 12/56* (2006.01)

(52) U.S. Cl. ............. 370/242; 370/248; 370/341; 370/401; 379/209.01; 379/210.01

(58) Field of Classification Search ............. 370/242, 370/248, 252, 328, 329, 341, 241.1, 395.21, 370/395.41, 352, 401; 379/112.06, 114.01, 379/114.05, 209.01, 210.01; 455/405, 450, 455/463, 464
See application file for complete search history.

(56) References Cited

U.S. PATENT DOCUMENTS

| | | | |
|---|---|---|---|
| 4,022,983 A | * | 5/1977 | Braun et al. ............ 379/209.01 |
| 5,550,827 A | | 8/1996 | Fernström ............... 370/392 |
| 5,574,727 A | * | 11/1996 | Fujino ..................... 370/350 |
| 5,781,716 A | * | 7/1998 | Hemphill et al. ............ 714/4 |
| 5,884,179 A | | 3/1999 | Patel ....................... 445/445 |
| 5,953,328 A | | 9/1999 | Kim et al. ............... 370/337 |
| 6,195,760 B1 | | 2/2001 | Chung et al. ............... 714/4 |

(Continued)

FOREIGN PATENT DOCUMENTS

EP  939 516  9/1999

(Continued)

OTHER PUBLICATIONS

Granbohm, Håkan and Joakim Wiklund, "GPRS—General packet radio service", pp. 82-88, Ericsson Review No. 2, 1999, Sweden.

(Continued)

*Primary Examiner*—Seema S. Rao
*Assistant Examiner*—Shick Hom
(74) *Attorney, Agent, or Firm*—Robert S. Burleigh

(57) ABSTRACT

Methods of re-establishing a connection between a radio network node and a core network having a control plane entity and a user plane entity in a communication network and of detecting faulty communication paths or re-started entities in such networks are provided. A control-plane entity sends an event in accordance with a media gateway control protocol to the user-plane entity that orders the user-plane entity to notify the control-plane entity when user-plane traffic is received from another network node or when a faulty path or re-started peer is discovered. In response to an order by the control-plane entity, a connection between the radio network node and the user-plane entity can be re-established. Heartbeat messages and heartbeat acknowledgment messages are sent through a communication path, and if a heartbeat acknowledgment message has not been received, the control-plane entity is notified of the faulty path. The heartbeat acknowledgment messages may include re-start counter values that are used to discover re-started peers.

8 Claims, 5 Drawing Sheets

U.S. PATENT DOCUMENTS

| | | | |
|---|---|---|---|
| 6,215,782 B1 | 4/2001 | Buskens et al. | 370/350 |
| 6,292,463 B1 * | 9/2001 | Burns et al. | 370/216 |
| 6,292,551 B1 | 9/2001 | Entman et al. | 379/221.04 |
| 6,603,975 B1 * | 8/2003 | Inouchi et al. | 455/450 |
| 6,640,105 B1 * | 10/2003 | Shin | 455/453 |
| 6,704,795 B1 * | 3/2004 | Fernando et al. | 709/237 |
| 6,891,801 B1 * | 5/2005 | Herzog | 370/237 |
| 6,928,067 B1 * | 8/2005 | Hameleers et al. | 370/352 |

FOREIGN PATENT DOCUMENTS

| | | | |
|---|---|---|---|
| JP | 2000059397 | | 2/2000 |
| WO | 9726739 | A1 | 7/1997 |
| WO | 9827691 | A1 | 6/1998 |
| WO | 9900946 | A2 | 1/1999 |
| WO | 9929065 | A2 | 6/1999 |
| WO | 9934635 | A3 | 7/1999 |
| WO | 9956478 | A1 | 11/1999 |
| WO | 9963774 | A1 | 12/1999 |
| WO | 200001173 | A1 | 1/2000 |
| WO | 200010357 | A1 | 2/2000 |
| WO | 200016579 | A1 | 3/2000 |
| WO | 00 22792 | A2 | 4/2000 |
| WO | 01 20848 | A1 | 2/2001 |

OTHER PUBLICATIONS

Ekeroth, Lars and Per-Martin Hedström, "GPRS support nodes", pp. 156-169, Ericsson Review No. 3, 2000, Sweden.

"3rd Generation Partnership Project (3GPP); Technical Specification Group Services and System Aspects; Feasibility Study for Transport and Control Separation in the PS CN Domain" TR23.873v1.1.O, 3GPP TSG SA2 Meeting #15, pp. 1-99, Jan. 22nd-26th, 2001, Los Angeles, California.

"3rd Generation Partnership Project; Technical Specification Group Services and System Aspects; GSM call and event data for the packet switched domain" 3G TS 32.015 version 3.0.0, pp. 1-59, 1999, France.

"Draft Recommendation H.248 with changes against white paper", ITU—Telecommunication Standardization Sector TD-XX, Study Group 16, pp. 1-136, Jun. 15, 2000, Geneva, Switzerland.

"3rd Generation Partnership Project; Technical Specification Group Services and System Aspects; General Packet Radio Service (GPRS); Service description; Stage 2", 3G TS 23.060 V3.3.0 (Apr. 2000) pp. 1-190, 2000, France.

"SGSN Decomposition", Tdoc S2-000888, 3GPP TSG SA2 Meeting #131, Berlin, May 22-26, 2000.

U.S. Appl. No. 09/903,364, filed Jul. 11, 2001, Bjelland et al.
U.S. Appl. No. 09/903,365, filed Jul. 11, 2001, Bjelland et al.

* cited by examiner

COMMUNICATION MANAGEMENT IN NETWORKS HAVING SPLIT CONTROL PLANES AND USER PLANES

This application claims priority to U.S. Provisional Patent Application No. 60/217,694 that was filed on Jul. 12, 2000, and that is incorporated here by reference.

BACKGROUND

This invention relates to methods and apparatus for telecommunication and in particular to use of Media Gateway Control protocol mechanisms in a packet-switched communication system having a split control-plane/user-plane architecture to enable control-plane nodes to re-establish connections toward peer nodes when packets are received in the user plane from other peer nodes and to discover communication failures in the user plane.

In a packet data communication system, information is exchanged as packets of digital data, or datagrams. Each data packet includes address information that enables the system to direct each packet on its own way through the system from a sender to a receiver. Thus, a packet data communication system does not maintain a continuous connection between a sender and a receiver. Packet data communication systems are sometimes called "connectionless" and packet-switched systems, distinguishing them from traditional telephony systems in which continuous connections are established between senders and receivers. Thus, traditional telephony systems are sometimes called "connection-oriented" and circuit-switched systems.

General packet radio service (GPRS) is a packet-switched communication system that is standardized by the European Telecommunications Standards Institute (ETSI) and the Third Generation Partnership Project (3GPP). See for example "Digital Cellular Telecommunications System (Phase 2+) (GSM); General Packet Radio Service (GPRS); Service description; Stage 2", 3GPP TS 03.60 ver. 7.6.0 Release 1998; and "General Packet Radio Service (GPRS); Service Description; Stage 2", 3GPP TS 23.060 ver. 3.3.0 Release 1999 (April 2000). GPRS is also described in H. Granbohm et al., "GPRS—General Packet Radio Service", *Ericsson Review* No. 2, pp. 82–88 (1999) and in L. Ekeroth et al., "GPRS Support Nodes", *Ericsson Review* No. 3, pp. 156–169 (2000).

GPRS operates with circuit-switched, cellular mobile telephone systems such as the Global System for Mobile (GSM) system, also standardized by ETSI and 3GPP, and the U.S. time division multiple access (TDMA) cellular system defined by the TIA/EIA-136 standard promulgated by the Telecommunications Industry Association (TIA) and Electronic Industries Association (EIA). By adding GPRS functionality to GSM and TDMA public land mobile networks (PLMNs), network operators can give their subscribers resource-efficient access to external Internet protocol-based (IP-based) networks like the Internet.

As depicted in FIG. 1, a GSM-style PLMN includes a number of interconnected network nodes, in particular, a mobile switching center/visitor location register (MSC/VLR), a home location register (HLR), and base station subsystems (BSS). The BSS handles radio communication with subscribers' mobile stations (MSs) via an air interface Um. The HLR is a database of information about the subscribers that is accessed by the MSC/VLR via a D-interface and that is accessed by a serving GPRS support node (SGSN) via a Gr-interface. The MSC/VLR routes circuit-switched calls to and from the MSs, communicating with the BSS over an A-interface. It will be appreciated that these nodes are typical of a circuit-switched network such as a PLMN, whether GSM or not. Data transfer and signaling interfaces are indicated in FIG. 1 by solid lines and signaling interfaces are indicated by dashed lines.

Packet data services and GPRS add nodes in a packet-switched portion of the communication network for handling packet data traffic; these nodes interwork with the circuit-switched portion of the communication system depicted in FIG. 1. For example, an SGSN is connected to the BSS via a Gb-interface and resides at the same hierarchical level in the network as the MSC/VLR. A gateway GPRS support node (GGSN) is the interconnection point to a packet data network (PDN) via a Gi-interface and is connected to the SGSN via a Gn-interface (which may be an IP backbone). User data to the Internet, directed for example, from a terminal equipment (TE) connected to a mobile terminal (MT), is sent encapsulated over the IP backbone. In FIG. 1, R is a reference point between a non-ISDN compatible TE and an MT. In this application, the end-user's equipment is called a mobile station (MS) whether it is a combination of a phone (MT) and a device such as a computer (TE) or just a phone.

The SGSN and GGSN can be combined into one physical node and deployed at a central point in the network, or a network may include several GGSNs and SGSNs as shown. Packet data streams and short text messages are handled in FIG. 1 by a Short Message Service—Gateway MSC (SMS-GMSC) and an SMS—Interworking MSC (SMS-IWMSC) that communicate with the HLR via a C-interface and with the MSC/VLR via an E-interface. As seen in FIG. 1, the SMS-GMSC and SMS-IWMSC exchange short messages with a short message switching center (SM-SC), and the SMS-GMSC communicates with the SGSN via a Gd-interface. It will be appreciated that the nodes depicted in FIG. 1 are typical of a packet-switched network, whether a GPRS network or not.

Most of the interfaces depicted in FIG. 1, and in particular the Gs- and A-interfaces, exchange messages with the help of the Signaling System Number 7 (SS7) that is standardized by ETSI and the American National Standards Institute (ANSI), among others. SS7 in GSM and GPRS uses a message transfer part (MTP) protocol to deliver messages and a signaling connection control part (SCCP) protocol for extended addressing. The SCCP protocol provides for each message to have an SCCP header that has a sub-system number for telling the node receiving the message which application should have the message. An SGSN, for example, typically has different sub-system numbers for communication with the HLR and with the MSC/VLR. An MSC usually derives the node type of a communicating peer node based on the sub-system number that may be stored in a database or included in an earlier message.

In a GPRS network, packet data channels (PDCHs) are mapped onto respective timeslots, thereby utilizing the same physical channel structure as ordinary circuit-switched GSM/TDMA channels. All radio resources are managed from a base station controller (BSC) in the BSS, which also includes Base Transceiver Stations (BTS); the pool of physical channels for a given cell can be used as either circuit-switched channels or packet-data channels. By packet multiplexing, the allocated PDCHs can be shared by every GPRS user in the cell, and the number of PDCHs in a cell can be fixed or dynamically allocated to meet fluctuating traffic demands. To support efficient multiplexing of packet traffic to and from mobile stations, or mobile terminals (MTs), packet data traffic channels (PDTCHs), packet associated control channels (PACCHs), and packet data common control channels (PDCCHs) are specified for the air interface Um, although PDCCHs are not always used.

As noted above, an SGSN serves every GPRS subscriber that is physically located within the SGSN's service area. To a large extent, the SGSN does for the packet data service what the MSC/VLR does for circuit-switched service. The mobility management functions for GPRS terminals that are performed by an SGSN include attach/detach, user authentication, ciphering, location management, and so on, and an SGSN supports combined mobility management for at least some mobile terminals by interworking with the MSC/VLR. An SGSN also manages the logical link to mobile terminals that carries user packet traffic, SMS traffic, and layer-3 signaling between the network and the GPRS terminals. An SGSN also routes and transfers packets between mobile terminals and the GGSN; handles packet data protocol (PDP) contexts (the PDP context defines important parameters, such as the access point name, quality of service, the GGSN to be used, and so on, for connection to the external packet data network); interworks with the radio resource management in the BSS; and generates charging data.

As noted above, the GGSN accommodates the interface to external IP-based networks. Access-server functionality in the GGSN is defined according to standards from the Internet Engineering Task Force (IETF). The GGSN functions as a border gateway between the PLMN and external networks, sets up communication with external packet data networks, authenticates users to external packet networks, routes and tunnels packets to and from the SGSN, and generates charging data.

The MSC/VLR also supports integrated mobility management for mobile terminals. GPRS attach and PDP-context activation must be executed in order for GPRS users to connect to external packet data networks. The mobile terminal makes itself known to the network by means of GPRS attach, which corresponds to IMSI attach used for circuit-switched traffic. Once the terminal is attached to the network, the network knows its location and capabilities. For some mobile terminals, circuit-switched IMSI attach and packet-switched GPRS attach can be performed at the same time.

GPRS attach is depicted by FIG. 2. In step 1, the mobile terminal requests that it be attached to the network. The terminal's request, which is sent to the SGSN, includes parameters that indicate its multi-timeslot capabilities, the ciphering algorithms it supports, whether it wants to attach to a packet-switched service or to both packet- and circuit-switched services, etc. In step 2, authentication is made between the terminal and SGSN, which may fetch relevant data from the HLR. In step 3, subscriber data from the HLR is inserted into the SGSN; and in step 4, information is passed to the terminal that indicates the terminal is attached to the network.

Before the mobile terminal can communicate with an external PDN (e.g., an IP network), a PDP context must be activated. The PDP context includes parameters that describe the characteristics of the connection to the external PDN, e.g., the address allocated to the MS, access point name (APN), QoS, and so on. PDP contexts may be primary or secondary, in which a secondary PDP context uses the same MS IP address and is connected towards the same APN (i.e., external net) as its respective primary PDP context. A composite PDP context contains one primary and zero or more secondary PDP contexts.

PDP-context activation is depicted in FIG. 3. In step 1, the mobile terminal requests PDP-context activation. In step 2, the SGSN validates the request based on subscription information received from the HLR during GPRS attach. In step 3, the APN is sent to a domain name server (DNS) from the SGSN to find the IP address of the relevant GGSN. In step 4, a logical connection is created between the SGSN and the GGSN (i.e., a GPRS Tunneling Protocol (GTP) tunnel is formed). In step 5, the GGSN assigns a dynamic IP address to the mobile terminal, if required, from the range of IP addresses allocated to the PLMN or externally, from a Remote Authentication Dial-In User Service (RADIUS) server (a fixed IP address from the HLR could also be used). A RADIUS client is included in the GGSN to support Password Authentication Protocol (PAP) and Challenge Handshake Authentication Protocol (CHAP) authentication to external networks with RADIUS servers. After an acknowledgment of the PDP context activation is returned to the MS (step 6), communication between the user and the external PDN (e.g., an Internet Service Provider (ISP) network or a corporate network) can commence (step 7).

Many network operators see an advantage in physically splitting node(s) in a network like that depicted in FIG. 1 into control plane node(s) and user plane node(s), thus better enabling independent scalability of signaling traffic and data traffic. In particular, the number of end-users is scalable independently of the end-user traffic. By connecting each user-plane node to several control-plane nodes and vice versa, it is possible to use the total network capacity more efficiently. Moreover, it is possible to dispose common user-plane nodes between the circuit-switched and the packet-switched portions of the communication network to reduce the necessary network resources even further and to provide a better migration path when circuit-switched equipment is replaced packet-switched equipment. Also, this enables cheaper replacement of the network nodes handling user-plane traffic as technology evolves.

The Universal Mobile Telecommunication System (UMTS) is a combined circuit-switched and packet-switched communication system. The circuit-switched portion has a split control-plane/user-plane architecture, and therefore physically splitting nodes in the circuit-switched portion of this system is already possible. The packet-switched portion does not have a split architecture, although a logical split already exists in the current specifications of the packet-switched portion and thus it may be just a matter of time before a split architecture is defined.

When a split architecture is implemented, a protocol for communications between control- and user-plane entities must be defined. Two such protocols are the H.248 and Media Gateway Control (MEGACO) protocols, which are similar enough that they will be called the H.248/MEGACO protocol in this application. The H.248/MEGACO protocol defines, in an open and flexible way, a generic framework for information exchange between control-plane and user-plane entities as well as application-specific packages that can be tailored to the different needs of an application like GPRS. The H.248 protocol is being developed by Study Group 16 of the International Telecommunications Union (ITU) (see Draft Recommendation H.248, ITU (Jun. 15, 2000), which is incorporated here by reference). The MEGACO protocol is being developed in the IETF's MEGACO working group (see N. Greene et al., "Megaco Protocol version 0.8", RFC 2885, IETF (August 2000) and T. Taylor, "Megaco Errata", RFC 2886, IETF (August 2000), which are the successors to N. Greene et al., "Media Gateway Control Protocol Architecture and Requirements", RFC 2805, IETF (April 1999)).

In these standardization protocols, the call/application function located in the control plane is called a Media Controller (MC) and the bearer/resource function located in the user plane is called a Media Gateway (MG). An MG normally converts media provided in one type of network to a format required in another type of network, and an MC controls the parts of a call state that pertain to connection control for media channels in an MG. For example, an MG may terminate bearer channels from a circuit-switched network (e.g., DS0 channels in a PSTN) and media streams from a packet-switched network (real-time transport protocol (RTP) streams in an IP network).

FIG. 4 depicts such a network that has two nodes and a split architecture. The nodes 402, 404 include respective MCs 406, 408 and respective MGs 410, 412. Communications on the interface between the media controllers, i.e., the control-plane entities, are conducted according to a call/application control protocol. Communications on the interface between the media gateways, i.e., the user-plane entities, are conducted according to a bearer/resource protocol. Communications on the interface between the control-plane and user-plane entities can be conducted according to the H.248/MEGACO protocol.

The H.248/MEGACO protocol is also organized according to user-plane concepts of Contexts, Terminations, Streams, and Descriptors, which can be better understood with the help of FIG. 5. P Contexts and Terminations relate to resources in the user plane. A Termination represents a physical or logical endpoint of flows of information, or media, and encapsulates media stream parameters as well as modem and bearer parameters. A Termination may include zero or more Streams and is identified by a TerminationID. Two Terminations are shown in FIG. 5. A Context logically groups one or more Terminations and is identified by a ContextID. A Context describes the topology (who hears/sees whom, i.e., the flow of media among Terminations) and the media mixing and/or switching parameters if more than two Terminations are involved in the Context. One Context that groups two Terminations is shown in FIG. 5. Each user plane entity (i.e., a media gateway in a split architecture like that shown in FIG. 4) can contain, or handle, several Contexts from several MSs. In general, Terminations are added/removed from Contexts by Add and Subtract commands.

Terminations have properties that have unique PropertyIDs, and related properties are grouped into Descriptors, which may be input or output parameters of commands. For example, a Stream describes a flow of media through a Termination in an MG. A Stream may include a received and/or a sent media flow, and is identified by a StreamID. Four bi-directional Streams are depicted in FIG. 5. The Streams 502, 504 are interconnected in the Context and hence they have the same StreamID. Similarly, the Streams 506, 508 are interconnected in the Context and hence they too have the same StreamID. Several Streams can be set up in one Termination, and FIG. 5 shows each Termination having two Streams. User data received by a media gateway is described by a Local Descriptor and user data sent by a media gateway is described by a Remote Descriptor.

The H.248/MEGACO protocol defines an Events Descriptor that describes events, conditions, parameters, etc. to be detected by an MG and what to do when such events are detected. The Events Descriptor typically contains a RequestID and a list of events that the MG is requested to detect and report. The RequestID is used to correlate the request with the notifications that it may trigger. Each event in the Descriptor typically contains an Event name, an optional StreamID, and other optional parameters. When an event is processed against the contents of an active Events Descriptor and found to be present ("recognized") in that Descriptor, the MG typically sends a Notify command to the MC. For example, conditions that might be monitored are the transferred information volume (e.g., the number of sent/received octets/packets) and the time duration of a communication session, which can be used as bases for charging a subscriber for the service provided.

The H.248/MEGACO protocol provides another Descriptor called a SignalsDescriptor, which is a parameter that contains a set of Signals that an MG applies to a Termination. There are three types of Signals: on/off, which is a Signal that lasts until it is turned off; timeout, which is a Signal that lasts until it is turned off or a specified time period elapses; and brief, which is a Signal having such a short duration that it will stop on its own unless a new Signal is applied that causes it to stop. Production of a Signal on a Termination is stopped by detection of an Event on the Termination, among other things. Signals are identified by SignalIDs and optionally by relevant StreamID, signal type, and duration, among others. A Media Controller can send a Signal to a Media Gateway to order the Media Gateway to perform an action, like send a message to its peer (in the user plane).

In GPRS, establishing a PDP context implies establishing a communication session in an MS, the radio network, an SGSN, and a GGSN. If no user-plane traffic is transmitted through this session for some time, the radio network may decide to release (or order release of) the connection between the radio network (or the MS) and the SGSN, while the connection between the SGSN and GGSN should remain. When user-plane traffic is transmitted again, the control plane nodes must re-establish the connection between the radio network (or the MS) and the SGSN. How this functionality can be achieved in a split architecture needs to be defined.

In addition, the current specifications of GPRS includes a "heartbeat" mechanism implemented by Echo Request and Echo Response messages. Every node/entity must send a message (Echo Request) to all its communication peers. If no reply (Echo Response) is received (possibly after some re-transmissions), the path towards this peer is considered faulty. If a reply is received and a re-start counter of the peer is different from the previously received counter value, the peer is considered re-started. This heartbeat mechanism is applied in both the control plane and the user plane. If a re-start or a path failure is discovered, all sessions (PDP contexts) towards the relevant peer might be released, or at least the involved MSs should be notified. The control plane entity is in charge of both the release process and the notification to the MS.

How this kind of heartbeat mechanism can be applied to a user plane entity, and how the user plane entity can report fault situations to the control plane in a split architecture need to be defined. A similar heartbeat mechanism can also be applied in the traditionally circuit-switched part of the network when that part uses packet bearers, e.g., IP packets.

In view of the effort being expended to develop the H.248/MEGACO protocol, it could be beneficial to use that protocol in a wide variety of communication environments, including GPRS for example. Aspects of this effort are described in "Feasibility Study for Transport and Control Separation in the PS CN Domain", 3GPP TR 23.873 ver. 1.1.0 (January 2001), which is incorporated here by reference. Further aspects are described in U.S. patent applications Ser. No. 09/903,364 and Ser. No. 09/903,365, both filed on Jul. 11, 2001, by F. Bjelland et al. Nevertheless, how the H.248/MEGACO protocol might be used in a packet-switched network like GPRS/UMTS or GPRS/TDMA has not been defined. One contributor to this problem may be that the split architecture is not yet standardized for GPRS.

SUMMARY

In accordance with one aspect of Applicants' invention, a method of re-establishing a connection between a radio network node and a core network having a control plane entity and a user plane entity in a communication network is provided. The control-plane entity sends an event in accordance with a media gateway control protocol to the user-plane entity, and the event orders the user-plane entity to notify the control-plane entity when user-plane traffic is received from another network node. The connection between the radio network node and the user-plane entity is released. User-plane traffic is received at the user-plane entity and in response the user-plane entity notifies the control-plane entity of this receipt and the connection between the radio network node and the user-plane entity is re-established.

The method may further include the step of forwarding the received user-plane traffic from the user-plane entity towards the radio network node after the connection has been re-established. Also, the connection may be re-established in response to an order by the control-plane entity, and the communication network may provide a general packet radio service.

In another aspect of Applicants' invention, a method of detecting a faulty path in a communication network having a control-plane entity and a user-plane entity includes the step of sending, from the control-plane entity to the user-plane entity, an event in accordance with a media gateway control protocol that orders the user-plane entity to notify the control-plane entity when the user-plane entity discovers a faulty path. The method also includes the steps of sending at least one heartbeat message through a communication path to another entity, determining whether a heartbeat acknowledgment message has been received through the path, and if a heartbeat acknowledgment message has not been received, notifying the control-plane entity of the faulty path.

This method may further include the step of sending, from the control-plane entity to the user-plane entity, a signal in accordance with the media gateway control protocol, that orders the user-plane entity to send heartbeat messages through the path. Also, the communication network may provide a general packet radio service, and the communication network may be an updated circuit-switched network that uses packet bearers.

In another aspect of Applicants' invention, a method of detecting a re-started user-plane peer in a communication network having a control-plane entity and a user-plane entity is provided. The control-plane entity sends, to the user-plane entity, an event in accordance with a media gateway control protocol that orders the user-plane entity to notify the control-plane entity when the user-plane entity discovers a re-started user-plane peer. Successive heartbeat messages are sent to a user-plane peer, and successive heartbeat acknowledgment messages may be received from the user-plane peer, where the heartbeat acknowledgment messages include re-start counter values. The re-start counter values of successive pairs of received heartbeat acknowledgment messages from a user-plane peer are compared, and if the comparison indicates that the user-plane peer has been re-started, the control-plane entity is notified of the re-started user-plane peer.

This method may further include the step of sending, from the control-plane entity to the user-plane entity, a signal in accordance with the media gateway control protocol that orders the user-plane entity to send heartbeat messages to user-plane peers. Also, the communication network may provide a general packet radio service, and the communication network may be an updated circuit-switched network that uses packet bearers.

BRIEF DESCRIPTION OF THE DRAWINGS

The features, objects, and advantages of this invention will be apparent from reading this description in conjunction with the drawings, in which.

DETAILED DESCRIPTION

This description is given in terms of GPRS for convenience only, and it will be appreciated that the principles of the invention can be applied in other packet-switched networks having suitable characteristics. This invention can be implemented in an MSC in a traditionally circuit-switched part of a network that has been updated to use packet bearers such as IP packets.

As described above, GPRS is organized according to mobility management (MM) contexts, PDP contexts, and GTP tunnels, and the SGSN is the GPRS support node (GSN) that is currently believed to benefit most from a split architecture.

The Media Controller (SGSN control plane) can send an Event (defined in a Media Gateway Control protocol) to the Media Gateway (SGSN user plane) indicating that the Media Gateway must notify the Media Controller when user plane traffic is (again) received from the GGSN. This Event should preferably be sent just before the connection between the Media Gateway and the radio network (or the MS) is released.

When the Media Controller is notified by the Media Gateway that the criterion(a) for the Event is(are) fulfilled (user plane traffic is received from the GGSN), the Media Controller can take necessary actions (i.e., re-establish the connection between the Media Gateway and the radio network (or the MS).

Figure 1:
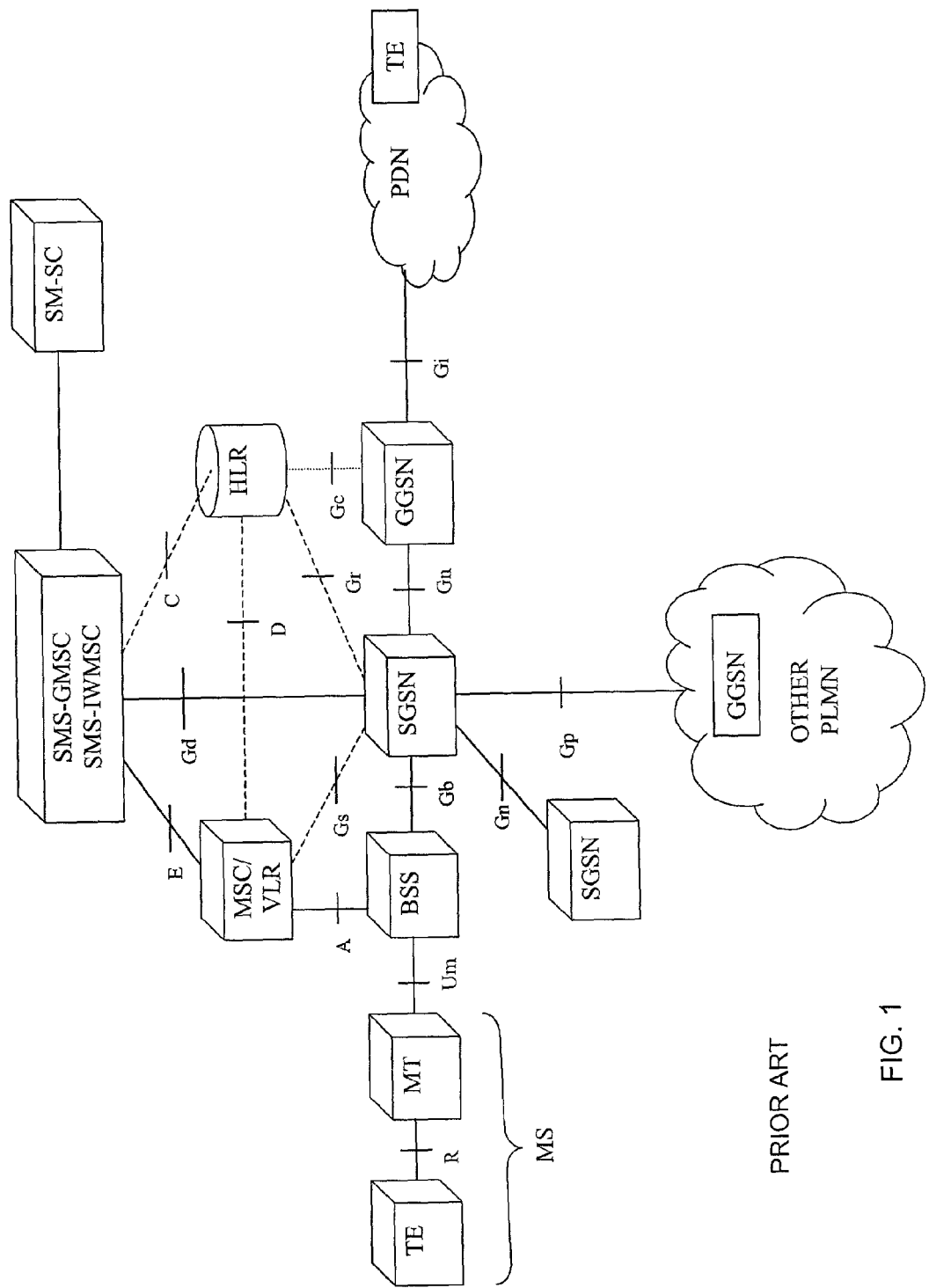
FIG. 1 depicts a combined packet-switched and circuit-switched communication network.
Figure 2:
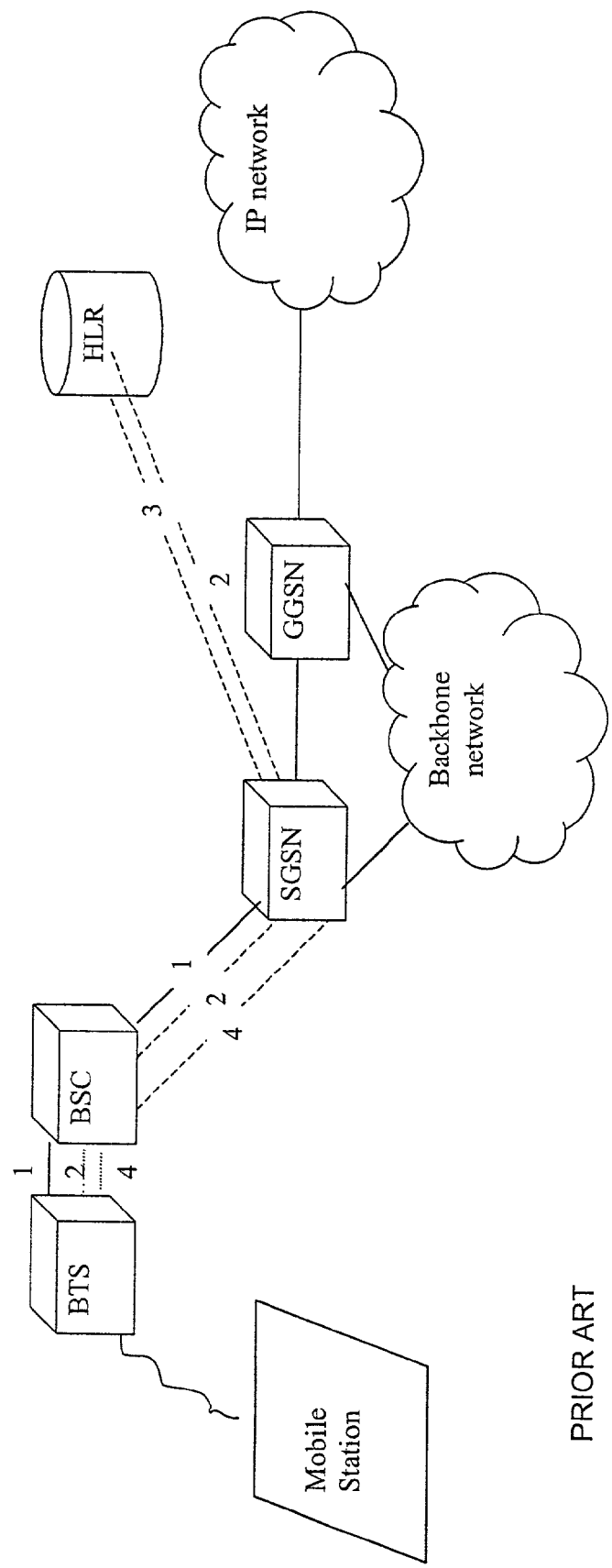
FIG. 2 depicts a simplified GPRS attach in a packet-switched network.
Figure 3:
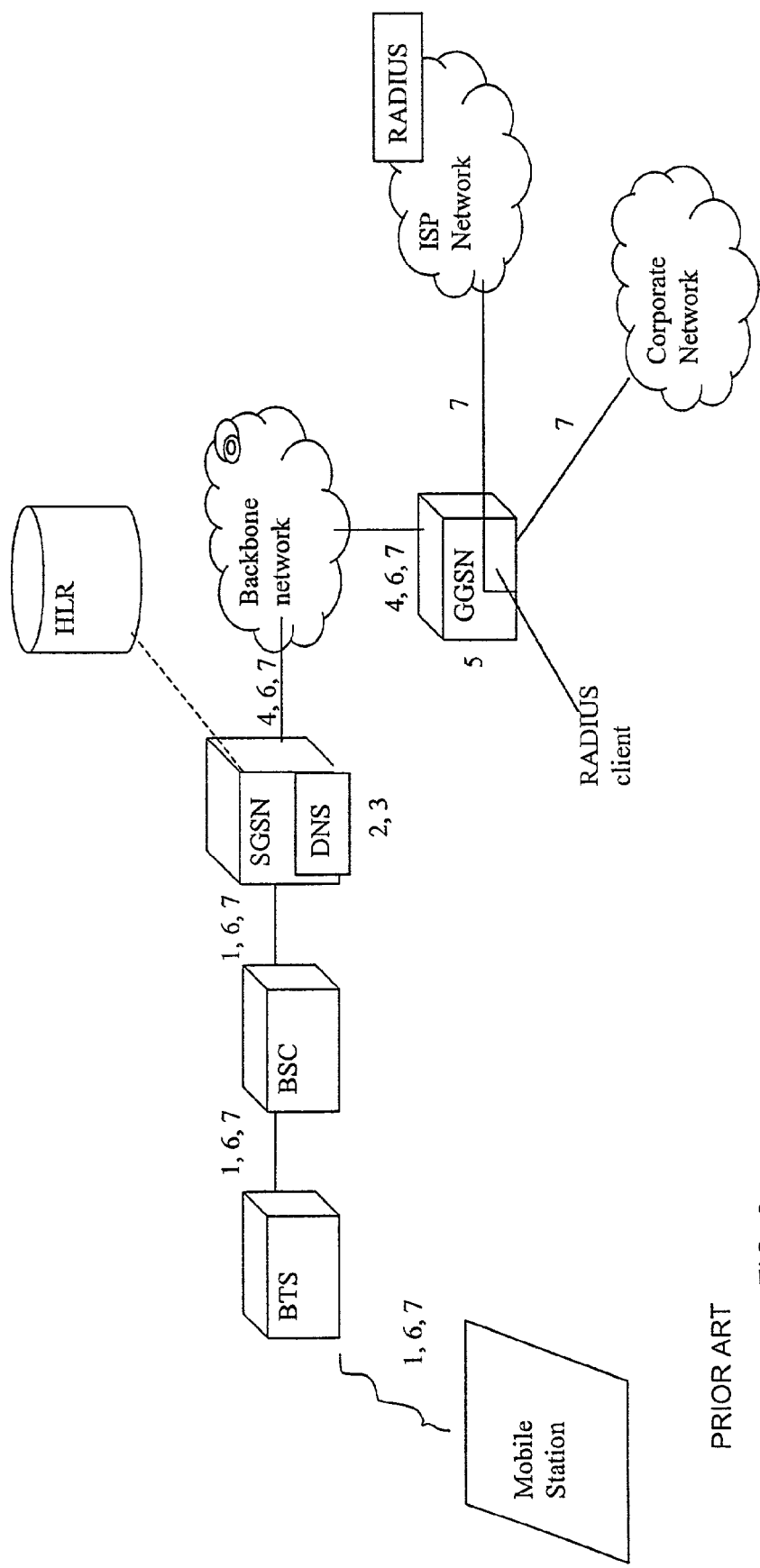
FIG. 3 depicts a simplified PDP context activation in a packet-switched network.
Figure 4:
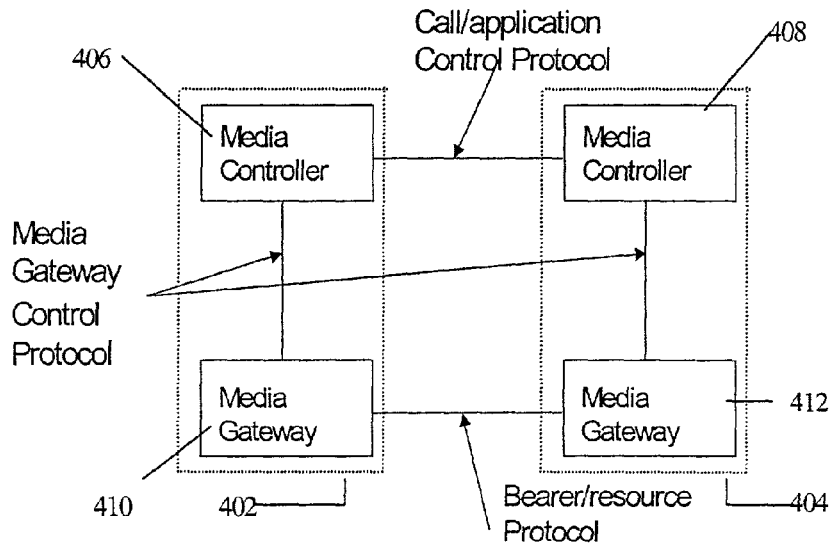
FIG. 4 depicts a network architecture in which nodes are split into control-plane and user-plane entities.
Figure 5:
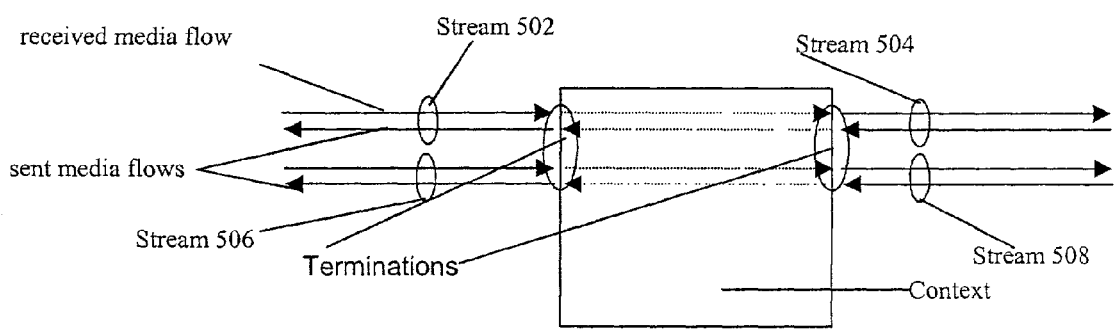
FIG. 5 depicts a conceptual organization of media gateway control protocol concepts.
Figure 6:
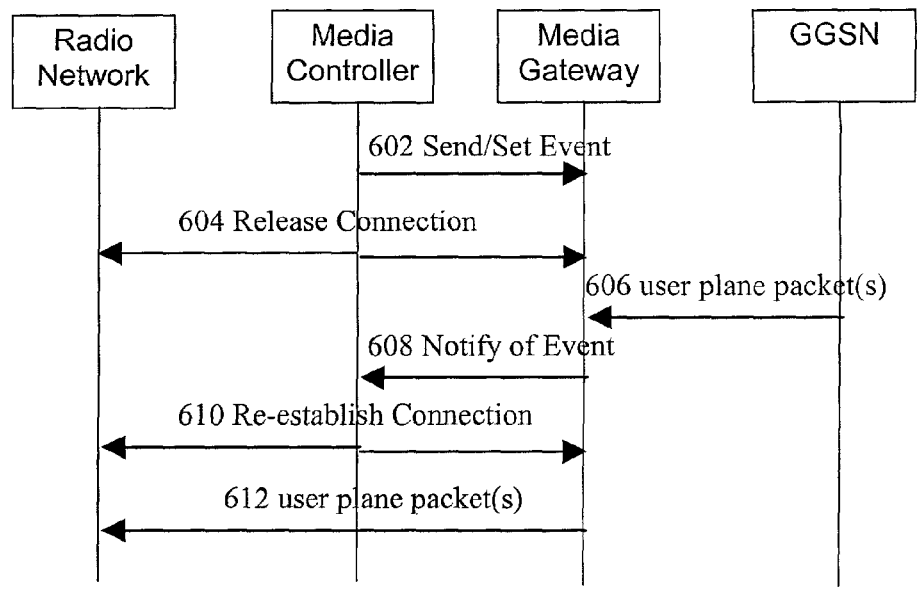
FIG. 6 depicts a method of re-establishing a connection between a radio network and an SGSN in a communication network having a split architecture.

FIG. 6 depicts a method of re-establishing a connection between a radio network and an SGSN (both an MC and an MG) in a communication network having a split architecture. The initial setup of the PDP context, and the condition triggering the release of the connection between the SGSN (both in the control plane and in the user plane) and the radio network (or the MS) is not shown in FIG. 6.

In step 602, the Media Controller sends/sets an Event to order the Media Gateway to report back when user plane traffic is received from the GGSN. In step 604, the Media Controller releases the connection between the radio network and the SGSN (both the Media Controller and the Media Gateway). In step 606, user-plane packet(s) from the GGSN are received in the Media Gateway. In step 608, the Media Gateway buffers received packet(s) until the connection towards the radio network is re-established, and notifies the Media Controller of this occurrence. In step 610, the Media Controller re-establishes the connection between the radio network and the SGSN (both the Media Controller and the Media Gateway). In step 612, the Media Gateway forwards the received packet(s) towards the radio network.

This method is an example of a simple solution for how mechanisms defined in a Media Gateway Control protocol can be used to re-establish a connection between an SGSN (both Media Gateway and Media Controller) and a radio network (or an MS) when the Media Gateway receives user-plane traffic from the GGSN in a split SGSN architecture. In particular, this solution eases the error handling procedures by identifying a particular condition that would otherwise have to be checked for its validity in the Media Gateway.

This method could apply for similar re-establishments, if applicable, when a control-plane node is in charge of re-establishing the connection and a user-plane node discovers that the connection must be re-established.

In another aspect of the invention, the Media Controller can send an Event to the Media Gateway to tell the Media Gateway that it must notify the Media Controller if any communication failure is discovered (like a faulty communication path towards a peer node or a re-started peer). Preferably, one such Event is sent per communicating peer node, but alternatively one Event could be sent for several peers. It will be appreciated that it is not necessary for a peer to have a split architecture; an MG communicates with that portion of the peer that is comparable to a user-plane entity.

The Media Controller can send a Signal to the Media Gateway to order the Media Gateway to start sending heartbeat messages towards a communication peer, or alternatively towards several communication peers. (The sending of the Signal is optional in this invention as the Media Gateway can discover by itself to which peers it should initiate sending of heartbeat messages.) Alternatively, the Event and/or Signal can be pre-provisioned in the Media Gateway and therefore not explicitly sent by the Media Controller; such pre-provisioning will nevertheless be understood as "sending" with respect to this application.

When the Media Controller is notified by the Media Gateway that the criterion(a) for an Event is fulfilled (e.g., a faulty user-plane path or a re-started user-plane peer is discovered), the Media Controller can take appropriate action (e.g., notify the MSs, release all sessions going towards this peer or using this path, etc.).

Figure 7:
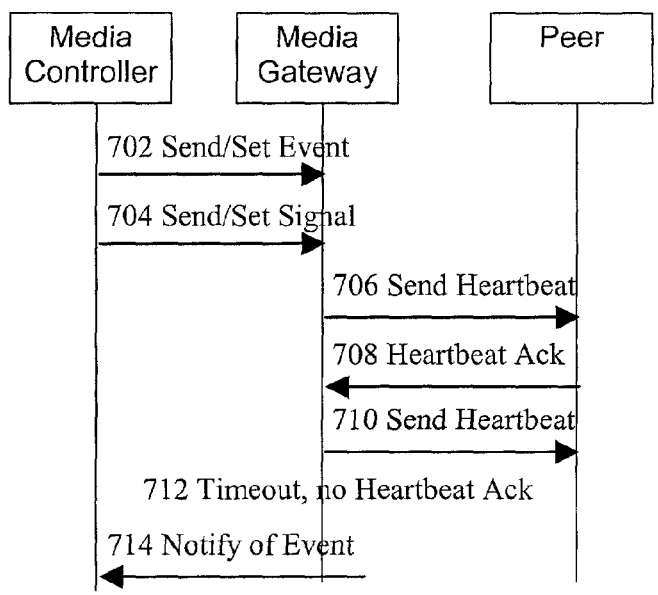
FIG. 7 depicts a method of detecting a faulty path.

A method of detecting a faulty path is shown in FIG. 7. In step 702, the Media Controller sends/sets an Event to order the Media Gateway to report back if any fault situation (e.g., a re-started peer, a faulty communication path or link, etc.) is discovered. In step 704, the Media Controller sends/sets a Signal to order the Media Gateway to start sending heartbeat messages. In step 706, the Media Gateway sends a heartbeat message to a peer through a communication path. In step 708, the Media Gateway receives a heartbeat acknowledgment from the peer through the path. In step 710, the Media Gateway sends another heartbeat to the peer. In step 712, the Media Gateway does not receive a heartbeat acknowledgment from the peer within a predetermined time period (possibly after having repeatedly sent a number of heartbeat messages to the peer). In step 714, the Media Gateway notifies the Media Controller of this occurrence. The Media Controller can then take appropriate action (e.g., notify the corresponding MSs, release all sessions using the faulty communication path, etc.).

A method of detecting re-started user-plane peers is similar to that shown in FIG. 7, but in such a method, a re-start counter value in the heartbeat acknowledge message would be compared to a previously received re-start counter value from this peer. If the re-start counter values were found to be different, the peer would be assumed to have re-started. The Media Gateway would inform the Media Controller of the situation, and the Media Controller could take appropriate action.

One of the advantages of this solution is that the Media Controller is informed as soon as a peer in the user plane is considered re-started or a path towards a user-plane peer is considered faulty. The Media Controller has the knowledge of all sessions (PDP contexts) going towards this peer, and the signaling is controlled from the control layer. Hence, the Media Controller can notify the MSs or initiate the release of all required sessions. In this way, unnecessary traffic is avoided.

It is currently believed that the methods described above are not limited to the H.248/MEGACO protocol but can be used for other Media Gateway Control protocols in a GPRS system, provided these other protocols use concepts that are suitably similar to the concepts used in the H.248/MEGACO protocol. In addition, Applicants' concept mapping should apply both for GPRS/UMTS and GPRS/GSM networks having one or more nodes, e.g., GSNs, split into Media Controllers and Media Gateways.

It will be appreciated that Applicants' invention also enables discovery of other fault situations (if such are introduced) in the user plane when discovery of the fault situation depends on communication with a user-plane peer. Moreover, the invention may be used for heartbeat functionality in a traditional circuit-switched network such as the circuit-switched portion of a UMTS, GSM, or similar network when packet bearers such as IP packets are used for circuit-switched sessions. Although such networks might not be considered traditional "circuit-switched networks" to the extent that they handle packet bearers, this terminology will be understood in this application to mean simply networks that are typical of traditional circuit-switched networks but that have been updated in that they handle packet bearers.

Applicants' invention is described above in connection with various embodiments that are intended to be illustrative, not restrictive. It is expected that those of ordinary skill in this art will modify these embodiments. The scope of Applicants' invention is defined by the following claims, and all modifications that fall within the scopes of these claims are intended to included therein.

What is claimed is:

1. A method of detecting a faulty path in a communication network having a control-plane entity and a user-plane entity, comprising the steps of:

sending, from the control-plane entity to the user-plane entity, an event in accordance with a media gateway control protocol, wherein the event orders the user-plane entity to notify the control-plane entity when the user-plane entity discovers the faulty path;

sending at least one heartbeat message through the path;

determining whether one of said at least one heartbeat acknowledgment message has been received through the path; and if one of said at least one heartbeat acknowledgment message has not been received, notifying the control-plane entity of the faulty path.

2. The method of claim 1, further comprising the step of sending, from the control-plane entity to the user-plane entity, a signal in accordance with the media gateway control protocol, wherein the signal orders the user-plane entity to send heartbeat messages through the path.

3. The method of claim 1, wherein the communication network provides general packet radio service.

4. The method of claim 1, wherein the communication network is a circuit-switched network using packet bearers.

5. A method of detecting a re-started user-plane peer in a communication network having a control-plane entity and a user-plane entity, comprising the steps of:

sending, from the control-plane entity to the user-plane entity, an event in accordance with a media gateway control protocol, wherein the event orders the user-plane entity to notify the control-plane entity when the user-plane entity discovers a re-started user-plane peer;

sending successive heartbeat messages to a user-plane peer;

receiving successive heartbeat acknowledgment messages from the user-plane peer, wherein the heartbeat acknowledgment messages include re-start counter values;

comparing re-start counter values of successive pairs of received heartbeat acknowledgment messages from the user-plane peer; and if the comparison indicates that the user-plane peer has been re-started, notifying the control-plane entity of the re-started user-plane peer.

6. The method of claim 5, further comprising the step of sending, from the control-plane entity to the user-plane entity, a signal in accordance with the media gateway control protocol, wherein the signal orders the user-plane entity to send heartbeat messages to the user-plane peer.

7. The method of claim 5, wherein the communication network provides general packet radio service.

8. The method of claim 5, wherein the communication network is a circuit-switched network using packet bearers.

* * * * *